US006570567B1

(12) United States Patent
Eaton

(10) Patent No.: US 6,570,567 B1
(45) Date of Patent: May 27, 2003

(54) SYSTEM AND METHOD FOR USING A GRAPHICAL INTERFACE FOR THE PRESENTATION OF GENEALOGICAL INFORMATION

(76) Inventor: Alan Eaton, 1412 E. 400 South, Springville, UT (US) 84663

( * ) Notice: Subject to any disclaimer, the term of this patent is extended or adjusted under 35 U.S.C. 154(b) by 258 days.

(21) Appl. No.: 09/584,619

(22) Filed: May 31, 2000

(51) Int. Cl.⁷ .............................................. G06T 17/00

(52) U.S. Cl. ....................... 345/428; 345/440

(58) Field of Search ................................. 345/428, 427, 345/581, 582, 440

(56) References Cited

U.S. PATENT DOCUMENTS 6,136,532 A * 10/2000 Freimer et al. ................. 435/6

* cited by examiner

Primary Examiner—Cliff N. Vo
(74) Attorney, Agent, or Firm—Workman, Nydegger & Seeley

(57) ABSTRACT

A system and method of displaying a pedigree chart are described. The system allows for the adjusting of the resolution of the pedigree chart on the display. For example, the amount of information regarding each individual, the font size of the text describing the individual, and the zoom of the pedigree chart may be altered. The display may also include another frame which shows a "hand print" of a selected individual in the pedigree chart. Hint information, conflict information, chronological sibling order, the end of ancestral lines, and descendant structure for individuals may also be clearly displayed.

41 Claims, 13 Drawing Sheets

SYSTEM AND METHOD FOR USING A GRAPHICAL INTERFACE FOR THE PRESENTATION OF GENEALOGICAL INFORMATION

CROSS-REFERENCE TO RELATED APPLICATIONS

The present application relates to co-pending U.S. patent application Ser. No. 09/583,794 titled "Systems and Methods for Distributed Genealogical Computing with Centralized Control," filed the same day herewith and incorporated herein by reference in its entirety, The present application also relates to co-pending United States patent application Ser. No. 09/584,462 titled "Data Compression and Data Structures for Genealogical information," also filed the same day herewith and incorporated by reference in its entirety.

BACKGROUND OF THE INVENTION

1. The Field of the Invention

The present invention relates to user interfaces. More specifically, the present invention relates to a graphical user interface that displays pedigree charts in a clear and flexible manner.

2. The Prior State of the Art

"Genealogy," the study of family histories, has taken on widespread popularity as individuals are increasingly desirous to learn more about family histories, particularly their own family histories.

Genealogy essentially involves gathering data regarding individuals in a common family. Typical gathered data might include the date and place of birth and death and other key events in the individual's life such as a marriage. The precise type of data gathered may differ according to the particular interests of the researcher.

Genealogy also involves the gathering of information regarding relationships between individuals in the common family. One common way of representing the relationships between many individuals is in the form of a tree called a pedigree chart. FIG. 9 shows an example of such a pedigree chart.

In FIG. 9, each individual is represented by a point or "node" in the tree. For example, the bottom-most individual is the latest-born individual in the tree and is represented by point 0. This individual is shown as the only individual in the first generation. "First" generation means the latest generation of individuals.

The individual 0 has a father and a mother. The father is represented by a point 00 and the mother is represented by a point 01. A line 00' connects the individual 0 to the father 00 thereby representing the child-parent relationship between the individual 0 and the father 00. Similarly, a line 01' connects the individual 0 to the mother 01 thereby representing the child-parent relationship between the individual 0 and the mother 01. The father 00 and the mother 01 are in the second generation working backwards from the first generation. Thus, lines 00' and 01' represent the link between the first and second generations.

The tree also includes the father's father 000, the father's mother 001, the mother's father 010, and the mother's mother 011 who represent the third generation in the tree. A line 000' connects the father 00 to the father's father 000; a line 001' connects the father 00 to the father's mother 001; a line 010' connects the mother 01 to the mother's father 010; and a line 011' connects the mother 01 to the mother's mother 011. Thus, lines 000', 001', 010', and 011' represent relationships between the second generation and the third generation working backwards from the first generation.

Though FIG. 9 shows only three generations in a family, the tree may be extended further back for any number of generations. A key limiting factor in extending the tree back forever is the tendency for it to become more difficult to gather data on an individual the earlier that individual appears in the pedigree chart. By viewing a pedigree chart such as the one shown in FIG. 9, a researcher can get a good clear idea of the relationships in a given family.

Pedigree charts may be drafted on paper. However, there are currently a number of software applications which maintain and display a pedigree chart. Conventional software packages are useful in that they allow for the basic display of a pedigree chart. Also, these conventional software applications allow the user to enter and maintain genealogical information and notes regarding the individuals in the pedigree chart.

While these pedigree charts offer some utility, it would be represent an advancement in the art to provide a flexible user interface which displays a flexible amount of information regarding each individual in the pedigree chart. Furthermore, it would represent an advancement in the art to visually emphasize individuals and/or relationships in the pedigree chart to provide the user with a convenience visual reference that emphasizes individuals and/or relationships having certain characteristics.

SUMMARY OF THE INVENTION

The foregoing problems with the prior art are overcome by the present invention which relates to methods and systems for displaying a pedigree chart on a display device of a computer system. The computer system is capable of executing a user interface generated by an application program with the aid of an operating system.

The pedigree chart allows for the adjusting of the resolution of the pedigree chart on the display. For example, the information resolution of the pedigree chart may be adjusted to allow for more or less text information to be displayed for each individual in the pedigree chart. For example, a low information resolution might display no text information for any of the individuals while a high information resolution might display all available text information for each individual. Also, the "font resolution" may be adjusted to allow for larger or smaller font size for the text information that describes the individual. A "size resolution" may be adjusted to zoom in or zoom out on the pedigree chart.

Each of these resolution adjustments also may have an effect on the number of generations of the pedigree chart that can be displayed within a given view. For example, the pedigree chart may show two, three, five, ten, twenty or any other number of generations depending on how the resolution of the pedigree chart is set.

The ability to view the pedigree chart with high resolution allows the user to view the entire pedigree chart. Thus, the user can get a much better idea of the structure of the pedigree chart even if the pedigree chart is quite complex containing many generations of individuals. The ability to view the pedigree chart with lower resolution allows the user to zoom in on areas of the pedigree chart that are of interest. Thus, the ability to adjust the resolution allows the user to be able to traverse through the pedigree chart with ease while being able to recognize the entire structure of the pedigree chart.

There may also be various other visual emphasizing information provided in the pedigree chart. For example, an individual that marks the end of a genealogical line may be represented by a special visual element such as a darkened or different-colored box compared to individuals that are not at the end of a genealogical line.

Also, special relationships may be distinguished by different colored lines connecting the individuals in the relationship. For example, a yellow or green line may indicate that a husband and wife have been married, or that they were married under a given set of circumstances.

Other visually emphasizing feature might include the ability to distinguish the chronological sibling position of an individual within a family, common ancestors, individuals for whom there is more information in another database, individuals for whom there is conflicting information in another database, ancestral lines between a given ancestor and his/her descendant, the descendants of a given individual, and so forth.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends both methods and systems for flexibly and clearly displaying a pedigree chart to a user using a graphical user interface. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
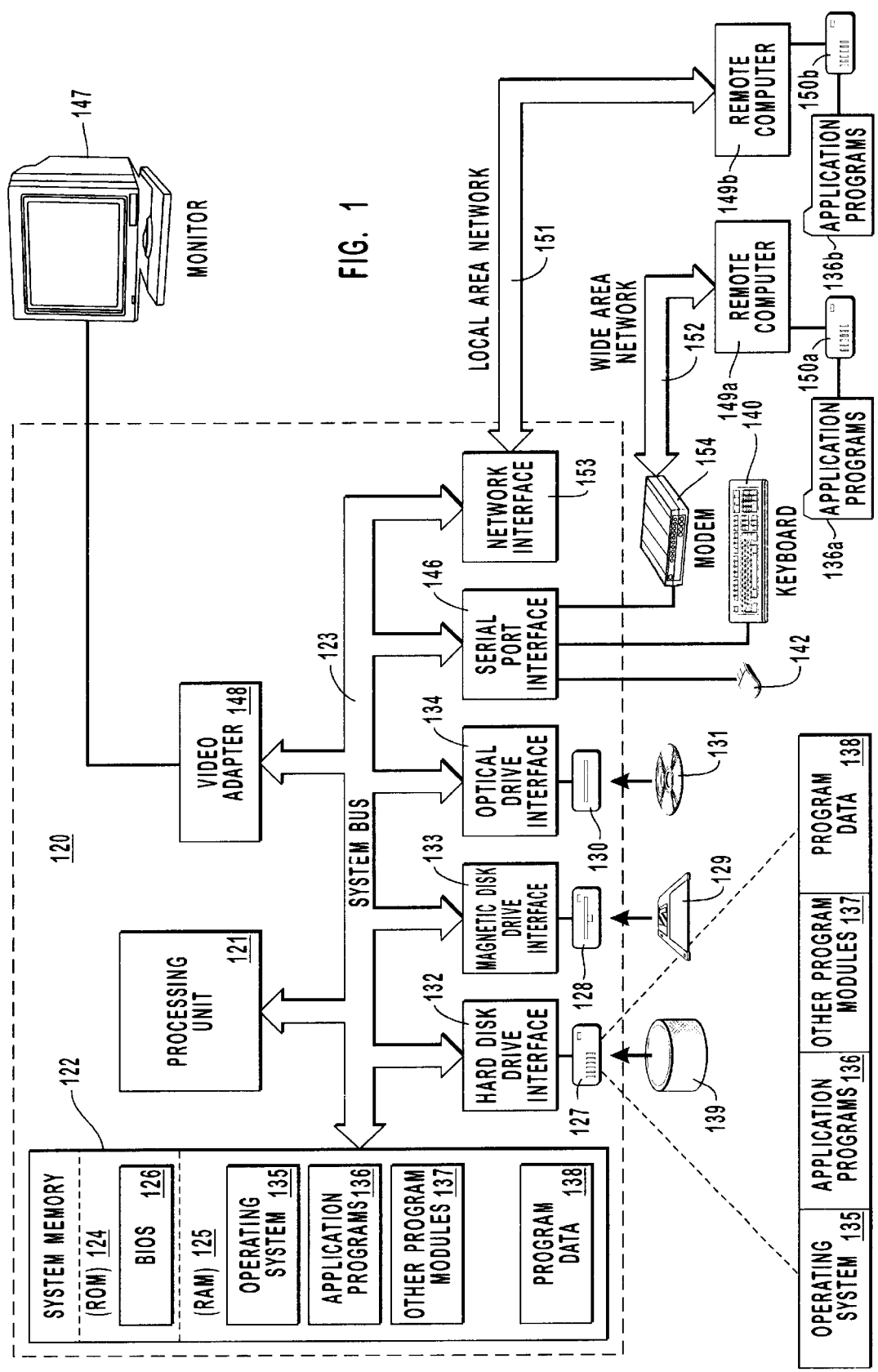
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, personal digital assistants and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically includes many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
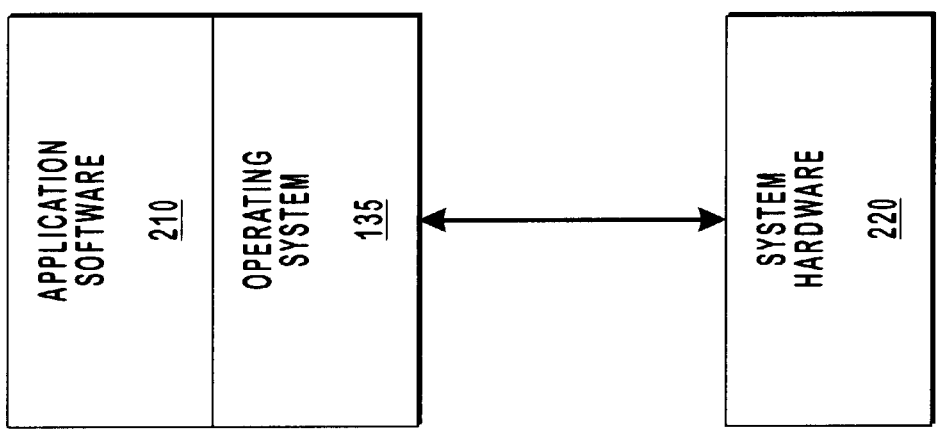
FIG. 2 illustrates the relationship between application software, the operating system and hardware devices shown in FIG. 1.

FIG. 2 illustrates one of the one or more application programs 136, namely application program 210, and its relationship with the operating system 135 and with system hardware 220 such as the monitor 147 of FIG. 1. The operating system 135 includes software modules or "drivers" for operating the system hardware 220. The operating system 135 may be used to translate high level commands issued by the application program 210 into the detailed operations needed to implement the high level command on the monitor 147. Typically, the application program 210 would accomplish this by calling a function available through an Application Program Interface (API) offered by the operating system 135.

Figure 3:
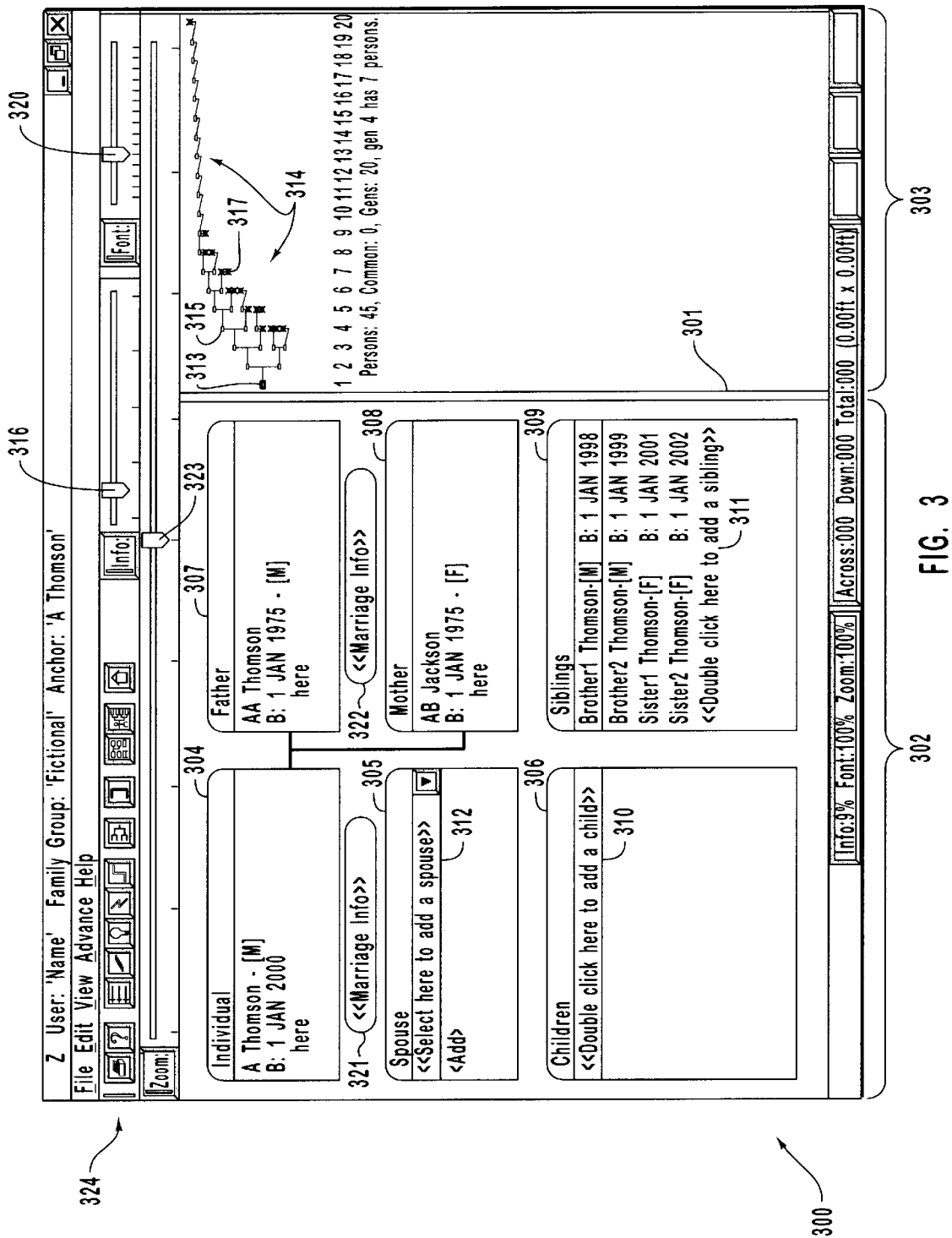
FIG. 3 illustrates a display that is rendered by the application software of FIG. 2 on the monitor of the computer of FIG. 1.

FIG. 3 illustrates a display 300 generated by the application program 210 by making appropriate function calls on the Application Program Interface offered by the operating system 135. The display 300 may be generated by the application program 210 with the optional assistance of Web browser software.

The display 300 generally includes two frames, a family frame 302 (also termed a "hand print" frame) to the left of the divider 301, and a pedigree frame 303 (also termed a "star field" frame) to the right of the divider 301. The hand print frame 302 displays family information relating to a selected focus individual. Information directly related to the selected focus individual is displayed in an individual field 304. Such information might include the birth date and place of the individual. For example, information field 304 shows that the selected focus individual is a male (M) having a first name of "A." and a last name of "Thomson" who was born Jan. 1, 2000. If the individual is deceased, the date and place of death might also be listed in the individual field 304.

Other fields in the hand print field 302 include people that have close relationships to the selected focus individual. For example, similar information for the selected focus individual's spouse, children, father, mother, children and siblings may be found in the spouse field 305, the children field 306, the father field 307, the mother field 308, and the siblings field 309, respectively. Thus, information regarding the selected focus individual and close relations of the focus individual may be conveniently viewed in the hand print field 302.

The hand print field 302 also allows for the convenient addition of family members to the selected focus individual. For example, the icon 310 indicates that the user may use a pointer device to select <<Double click here to add a child>> to add new children of the selected focus individual. Likewise, the icon 311 indicates that the user may select the icon to add siblings of the selected individual. The icon 312 indicates that the user may select the icon to add the spouse of the selected individual. If the father and mother of the selected individual was not already known, a similar icon may appear in the father and mother field to indicate the ability to add a father or mother. An icon 321 indicates the ability to select the icon to add marriage information regarding the selected focus individual and his/her spouse. Icon 322 indicates the ability to select the icon to add marriage information regarding the selected focus individual's parents. Upon selecting the icon 310, 311, 312, 321 or 322, a pop up window may appear guiding the user as to the fields that may be entered for the new individuals or marriage information to be added.

As mentioned above, the display 300 also includes a pedigree frame 303 or "star field" frame which illustrates in a clear fashion a pedigree chart 314 which includes the selected focus individual. The selected focus individual is represented by the box 313 that has a highlighted border. Thus, as a user may quickly and clearly identify the pedigree position of the selected individual focused on in the family frame 302. In FIG. 3, the selected individual is the "anchor" individual. In other words, the selected individual is in the latest generation of the pedigree chart and is the individual for whom the ancestral lines are formed to create the pedigree chart.

The pedigree chart 314 is assembled using records or "hand prints" for each of the individuals in the family represented by the pedigree chart. These individual records may be stored locally in, for example, local system memory 122 (FIG. 1) or may be remotely stored in, for example) remote computers 149a or 149b. Alternatively, the individual records may be cached with most recently or frequently access records being stored in local system memory 122 and with less frequently, rarely, and never accessed records being stored in one or both of the remote computers 149a or 149b. A system and method for using the individual records to efficiently assemble a pedigree chart such as pedigree chart 304 is described in co-pending U.S. patent application Ser. No. 09/584,462, previously incorporated herein by reference.

The user may change the selected focus individual by selecting a different individual in the pedigree chart. For example, to change the selected individual to the individual represented by box 315 in the pedigree chart 314, the user might use a pointing device such as a mouse and double-click on the box 315. In response, the selected individual will become the selected individual in the hand print frame 302.

Individuals representing the end of a genealogical line are represented by visually different box types than individuals that do not represent the end of a genealogical line. An individual is at the end of the genealogical line when there are no parents of the individual within the pedigree chart 314. For example, individual 317 is represented by a "X" rather than by a box. Other ways of differentiating such individuals might be to darken the box. In a color display, the individual 308 may be represented by a box of a different color such as a red box. Thus, a user may quickly identify those individuals that represent the end of a genealogical line and identify those lines in which more genealogical research can be performed. Since the boxes are so small in FIG. 3, darkening of the boxes might be difficult to visually distinguish. Thus, FIG. 3 shows the earliest individuals in any generational line as a "X" for clarity.

Note that all twenty generations of the pedigree chart 314 are displayed in the star field 303. However, there is no textual information regarding any of the individuals displayed in the pedigree chart. The display 300 includes an information resolution adjuster icon 316 that may be adjusted by, for example, clicking on the icon with a pointing device and dragging the icon left for less information resolution, or right for more information resolution. In this description and in the claims, "information resolution" is the amount of information displayed in the pedigree chart 314 for each individual. A higher information resolution would indicate more textual information while a lower resolution would indicate less textual information.

Figure 4:
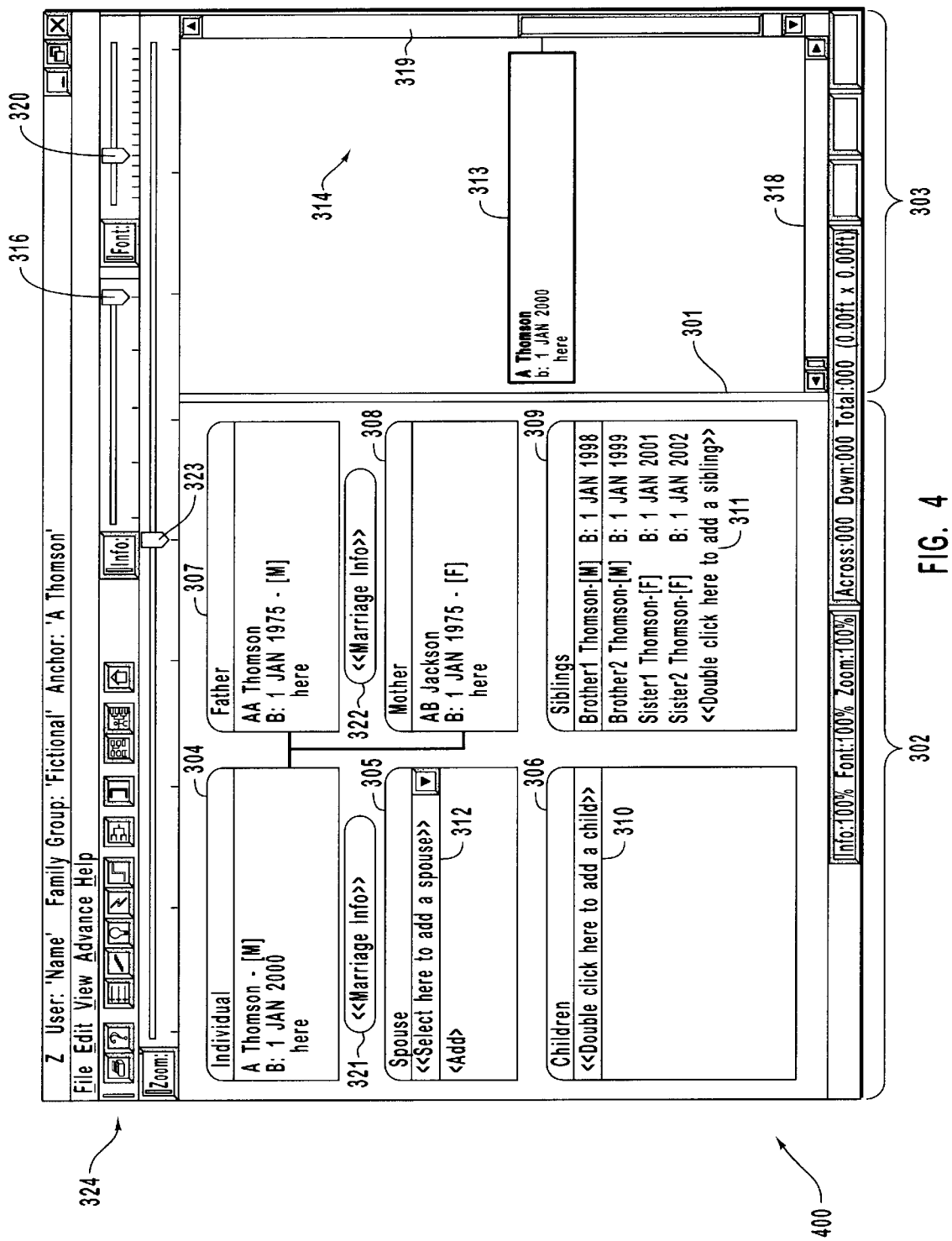
FIG. 4 illustrates the display of FIG. 3 in which the information resolution of the pedigree chart has been increased.

FIG. 4 illustrates a display 400 that is similar to display 300 of FIG. 4 except that the information resolution adjuster icon 316 has been moved to the right to increase the information resolution displayed in the pedigree chart 314. In FIG. 4, the birth date and place of the individuals are displayed. Since the text takes up so much room, the star field view has been adjusted to allow for only one of the generations in the pedigree chart 314 to be viewed. However, a horizontal scroll bar 318 and a vertical scroll bar 319 have been provided to allow the user to move to different portions of the pedigree chart 314 in a quick and convenient fashion.

The display 300 also includes a font resolution adjuster 320 that may also be adjusted to the left for less font resolution, or right for more font resolution. In this description and in the claims, "font resolution" is the size of the font with a lower font resolution indicating smaller font size and with a greater font resolution indicating a larger font size.

Figure 5:
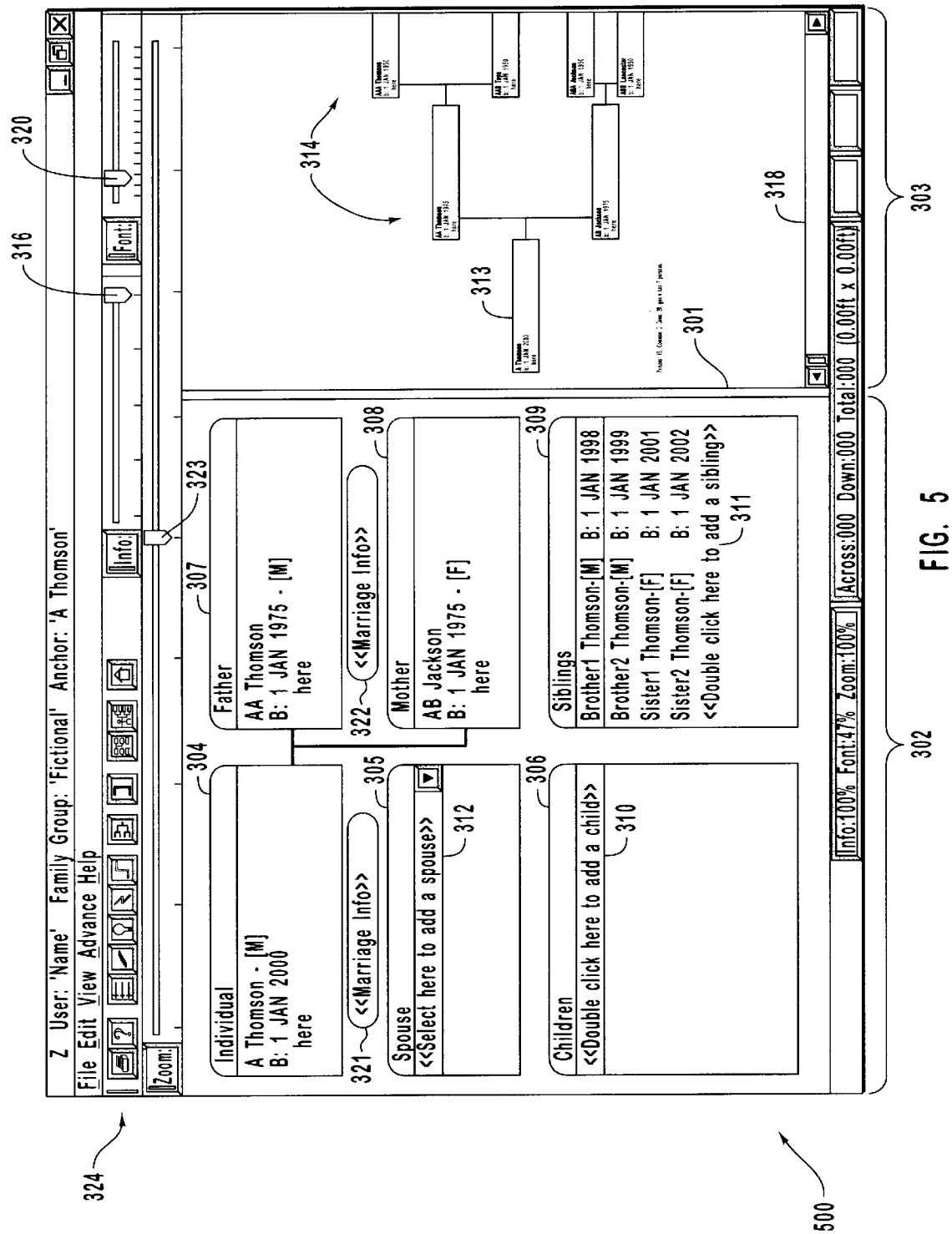
FIG. 5 illustrates the display of FIG. 4 in which the font resolution of the pedigree chart has been decreased for a smaller font size.

FIG. 5 illustrates a display 500 that is similar to the display 400 of FIG. 4 except that the font resolution adjuster 320 has been moved to the left indicating a smaller font size is to be used for displaying text information in the star field 303. The reduction in font size allows for more of the pedigree chart 314 to be displayed in the star field 303. Since a vertical scroll bar is no longer needed to navigate the pedigree chart 314, the vertical scroll bar is no longer displayed in FIG. 5.

Figure 6:
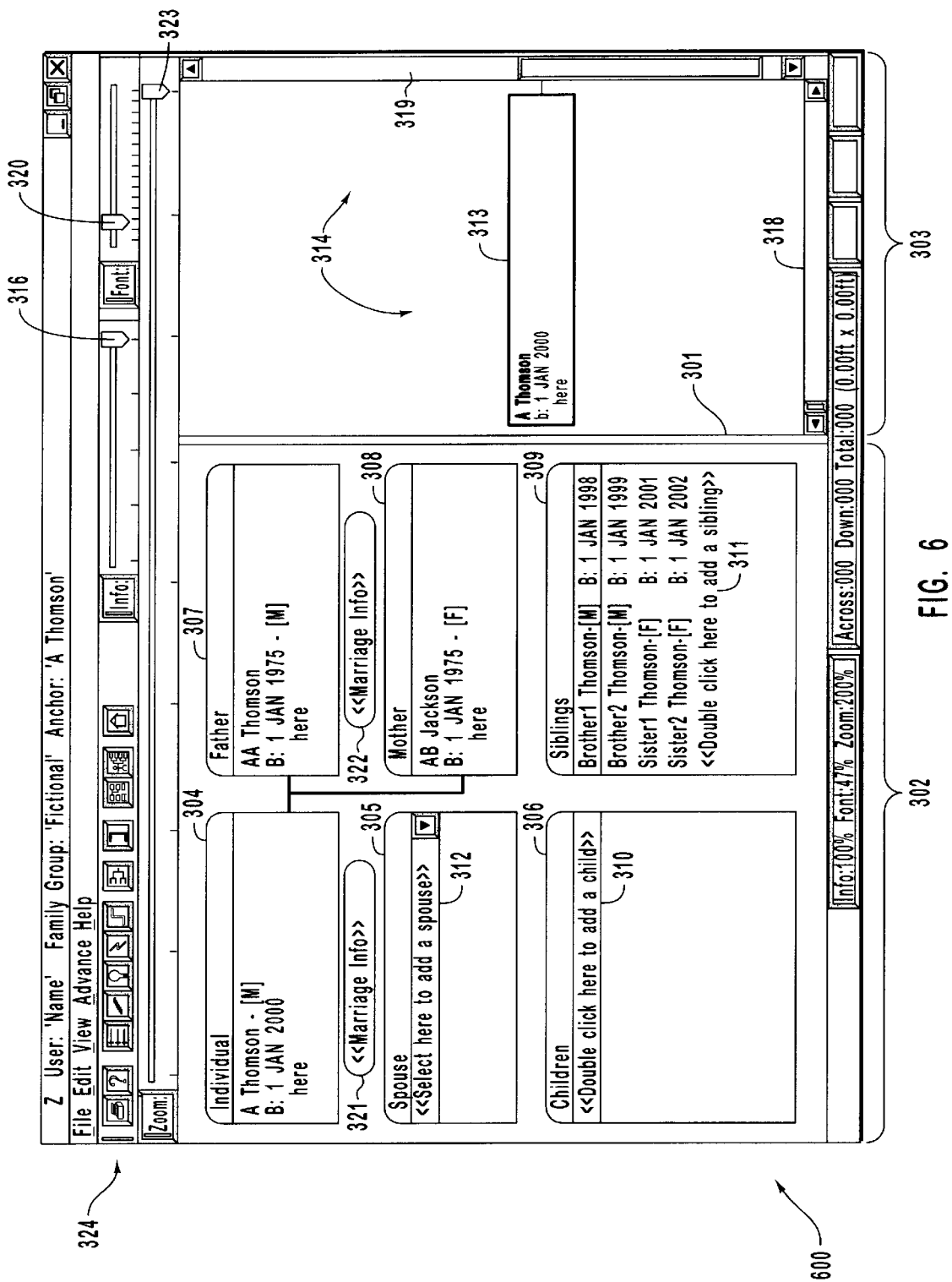
FIG. 6 illustrates the display of FIG. 5 in which the size resolution of the pedigree chart has been changed to zoom in on a portion of the pedigree chart.

The display 300 also includes a size resolution adjuster 323 that may be adjusted to the left to zoom out the view of the star field 303, or to the right to zoom in the view of the star field 303. In this description and in the claims, size resolution is the relative zoom of the star field 303. Also, in the description and in the claims, "resolution" is defined as being any one or more of information resolution, font resolution, and/or size resolution. FIG. 6 illustrates a display 600 that is similar to the display 500 of FIG. 5 except that the size resolution adjuster 323 has been moved to the right to zoom in on the pedigree chart 314.

There are a number of features of the user interface which allow the user to quickly and easily evaluate the star field. These features may be activated by selecting the appropriate icon. For example, an icon row 324 lists a number of button gadgets that may be activated or pressed using a pointer device such as a mouse. Each of the features will be described in order from left to right skipping the print and help buttons.

Figure 7:
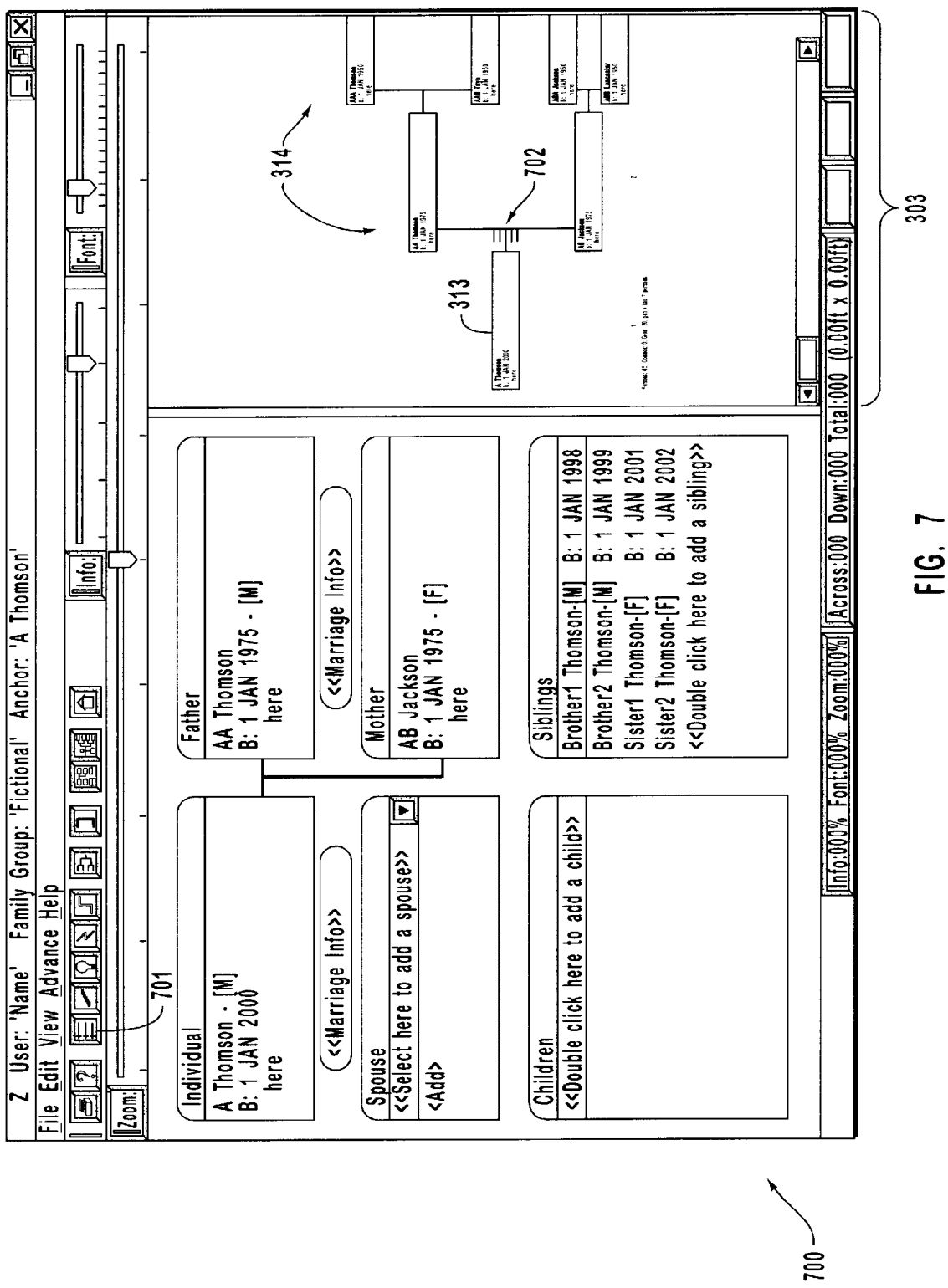
FIG. 7 illustrates the display in which the chronological sibling position of the selected individual is visually represented in the pedigree chart.

FIG. 7 illustrates a display 700 in which a chronological sibling position of the selected individual 313 is visually represented in the pedigree chart 314. First, the user generates an instruction to display the chronological sibling position. For example, the user might select or press a chronological sibling position button 701 to activate this feature. In response, the star field frame 303 displays horizontal lines 702 extending leftward from the vertical line connecting the father and mother of the selected individual. Each of the horizontal lines represents a child of the mother and father of the selected individual. In this example of FIG. 7, there are two horizontal lines above the selected individual and two horizontal lines below the selected individual. Accordingly, the user can visually determine that the selected individual is third of five children.

Figure 8:
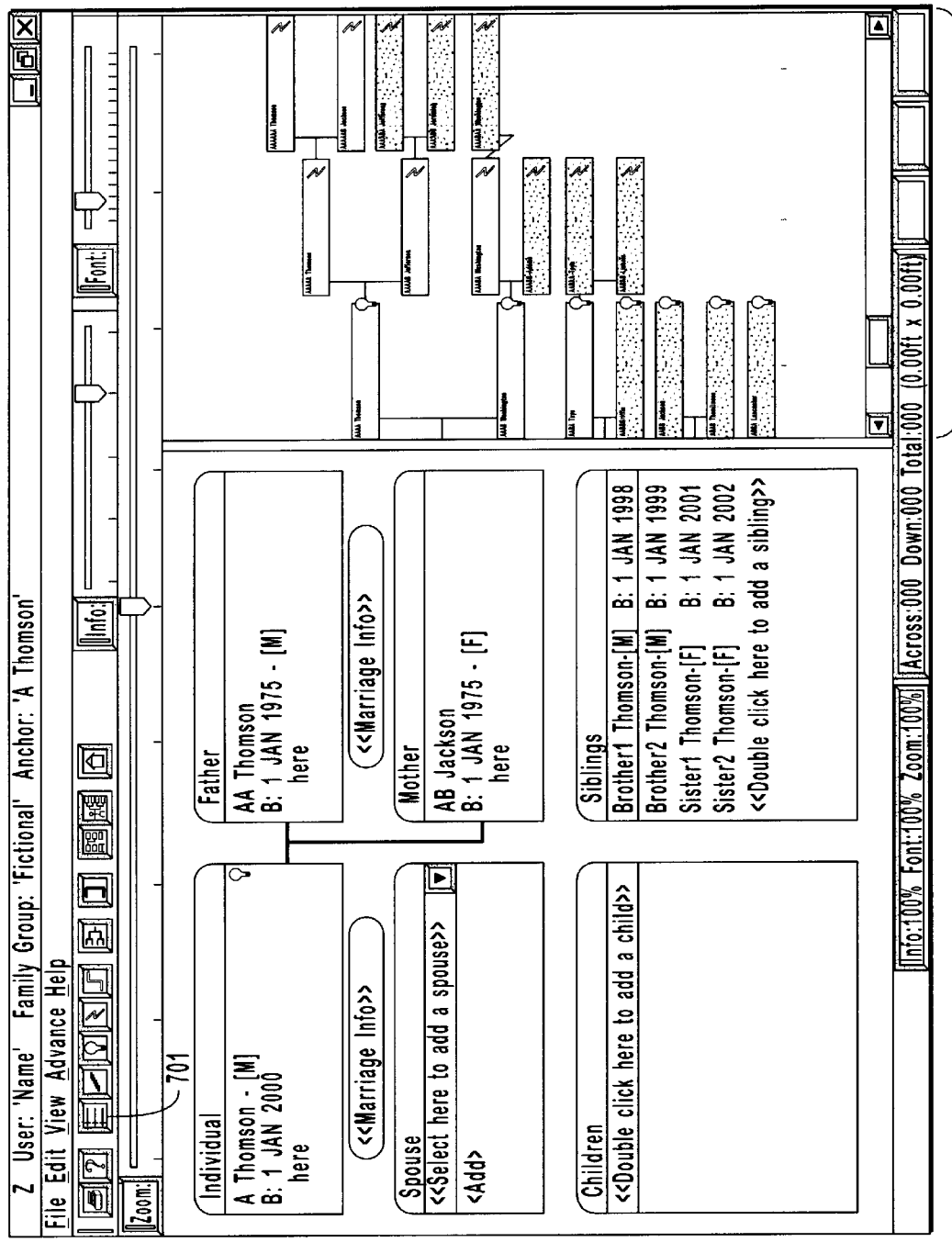
FIG. 8 illustrates the display in which the common ancestors, hint, and conflict buttons are activated.

FIG. 8 illustrates a display 800 in which a common ancestor button 801, a hint button 802 and a conflict button 803 are activated. A common ancestor is an ancestor that appears twice or more in a pedigree chart. The farther back in history the pedigree chart extends, the greater the likelihood of there being common ancestors. If the common ancestor button 801 is active, then any common ancestors in the pedigree chart 314 will be visually distinguished. This might be accomplished by making the box that represents the individual a different color or shape than the other individuals in the pedigree chart.

The hint button 802 is activated to show those individuals in the pedigree chart for which there is further information. This information may have been obtained by, for example, searching a database on a remote computer such as computers 149a or 149b for other information regarding that individual. For example, the database may have indicated that the individual is the son of another individual. If the pedigree chart indicates that this individual represents the end of an ancestral line, then perhaps the ancestral line can be extended further back using the information in the database. In FIG. 8, the individuals for which there is hint information are represented by having a light bulb in the right portion of the box representing the individual.

The conflict button 803 is activated to show individuals in the pedigree chart for which conflicting information was found in a database. This database may be on a remote computer such as remote computers 149a or 149b or FIG. 1. Often, when performing genealogy work, different researchers will discover the same individual. Often, however, the information regarding the individual submitted by one researcher will differ from that submitted by the other researcher. For example, perhaps one researcher submitted the individual's name as Mary Barlough while another submitted the name as Mary Barlow. The individual in the pedigree chart 314 would be flagged or visually distinguished to represent that a conflict has been found. In FIG. 8, this is visually represented by a lightning bolt in the right portion of the box representing the individual. Though the conflict may not ever necessarily be resolved, the display will selectively visually distinguish that conflict.

Figure 9:
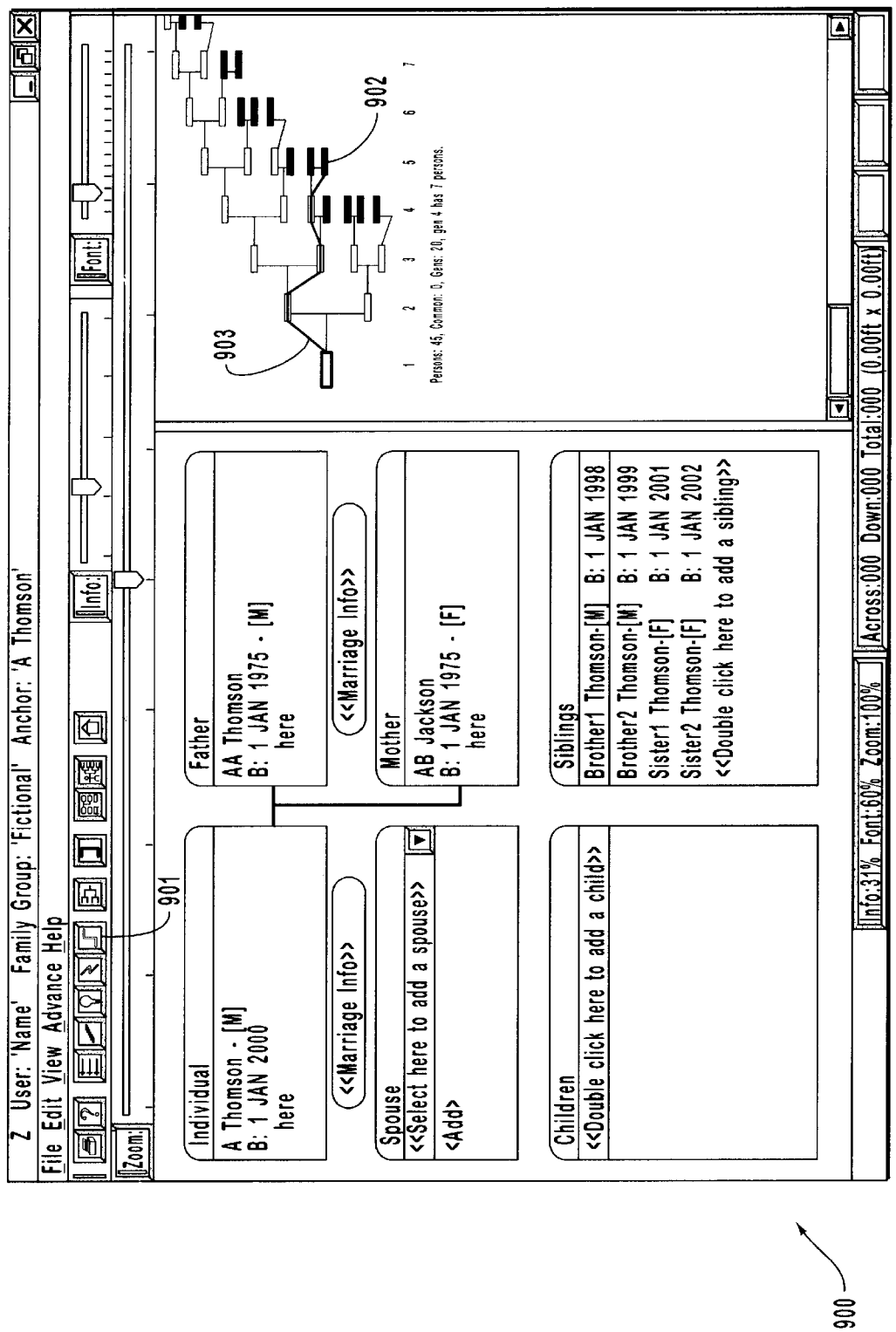
FIG. 9 illustrates the display in which an ancestral line connected a selected ancestor to the anchor individual is highlighted.

FIG. 9 illustrates a display 900 in which a tracer button 901 is activated. The tracer button may be used to trace ancestral lines between the anchor individual and selected ancestors of the anchor individual. The ancestor may be selected by moving a pointer to the ancestor. In FIG. 9, that ancestor is represented as 902. A line 903 is then formed which joins the ancestral line thus illustrating the relationship between the ancestor and the anchor individual. This feature is especially useful in more complex pedigree charts in which the ancestral line may not be clear from a visual inspection of a conventional pedigree chart.

Figure 10:
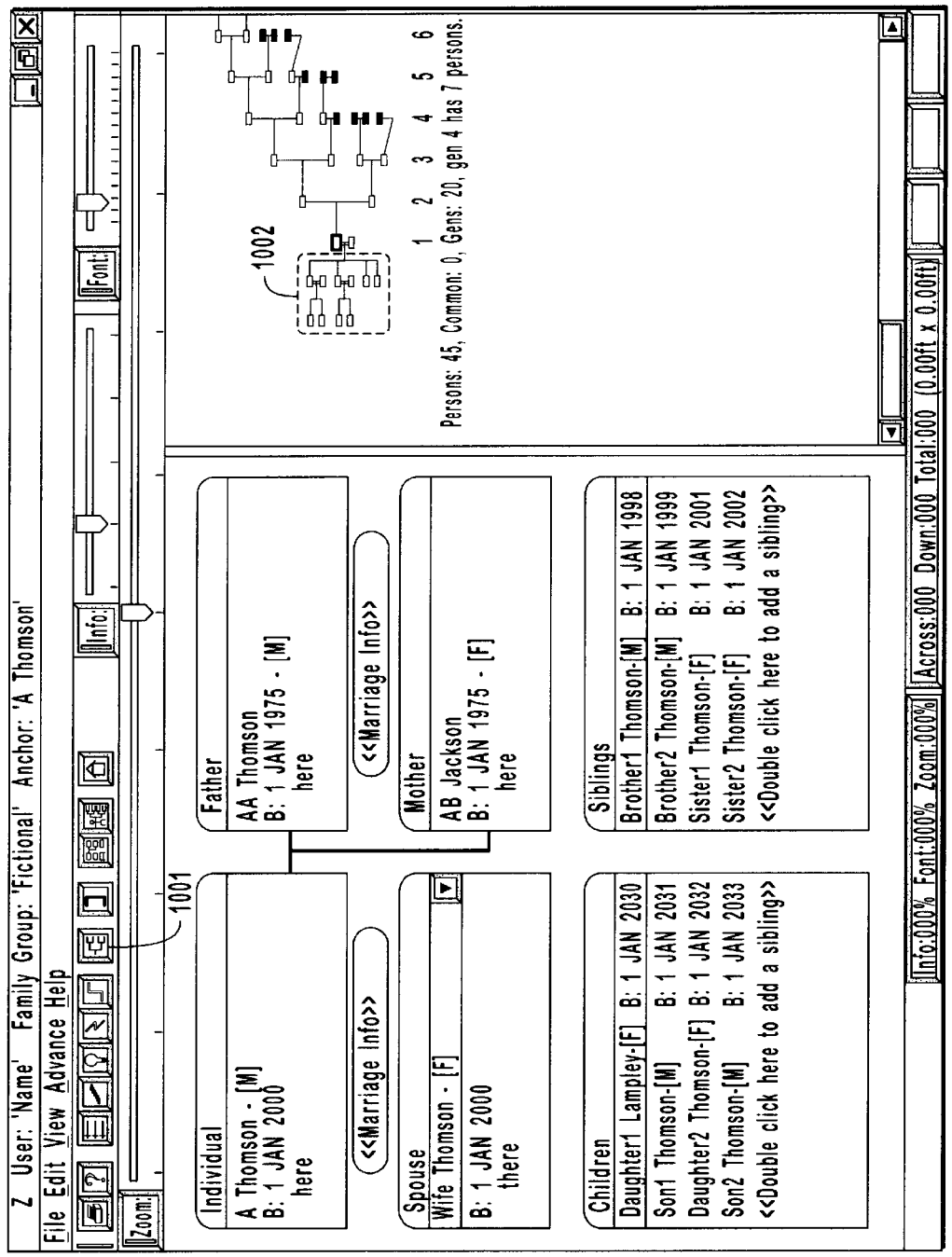
FIG. 10 illustrates the display in which the descendant structure of the anchor individual is illustrated in the pedigree chart.

FIG. 10 illustrates a display 1000 in which the descendant structure of the anchor individual is illustrated in addition to the ancestor structure of the anchor individual. In FIG. 10, this descendant structure is illustrated as 1002. This structure illustrates that the anchor individual has 4 children, 2 of whom are married. The married children in turn both have 2 children each of their own.

Figure 11:
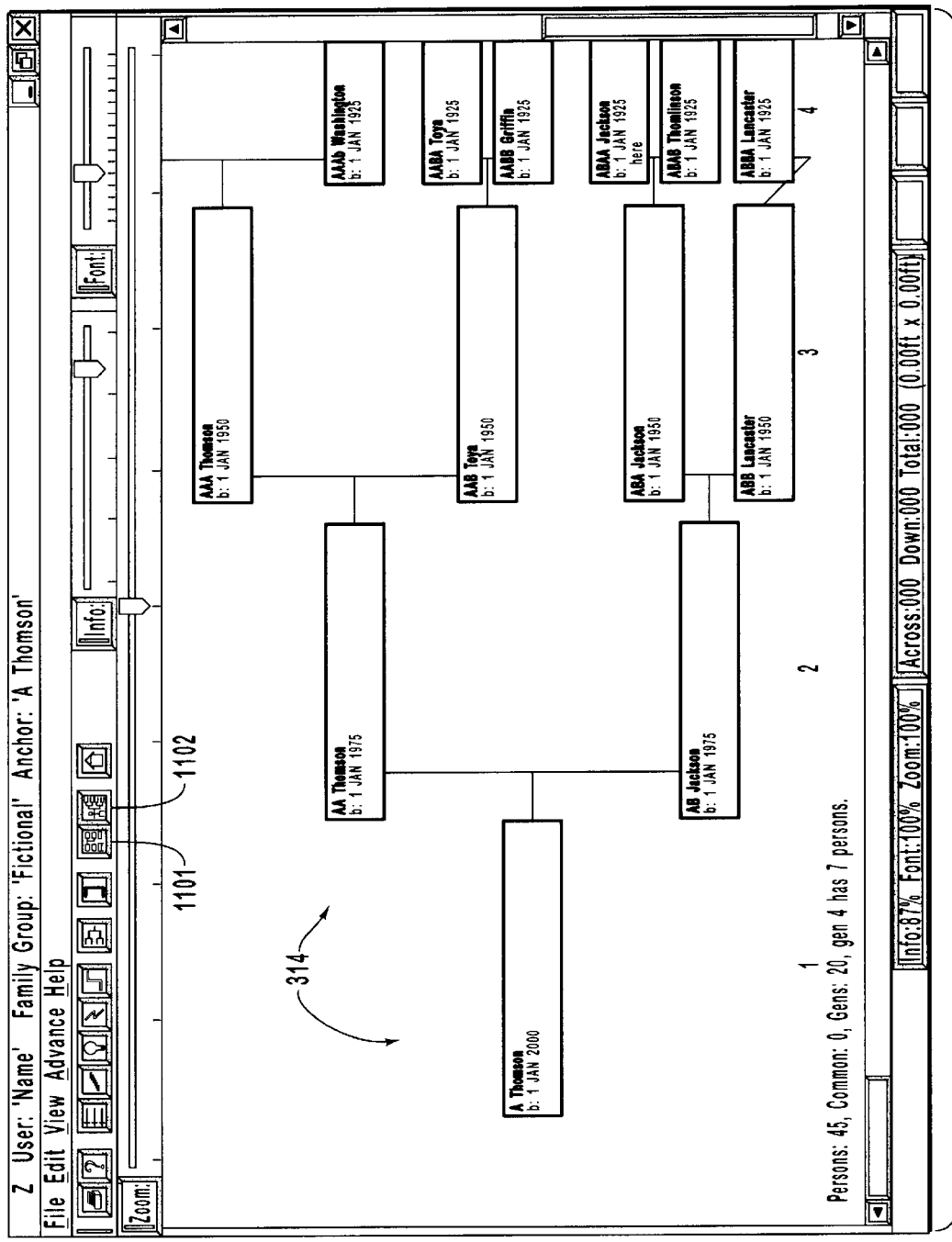
FIG. 11 illustrates the display in which the star field showing the pedigree chart is maximized.

FIG. 11 illustrates a display 1100 in which the star field 303 is maximized to illustrate more of the pedigree chart 312. In the displays of FIGS. 3 through 10, both the hand print view button 1101 and the star field view button 1102 were activated so that both views 302 and 303 were displayed. In the display 1100, the hand print view button 1101 is deactivated thereby allowing the star field frame 303 to occupy the screen.

Individuals are connected in the pedigree chart 304 using a configuration of lines. For example, individuals are connected to both their father and mother by a horizontal line that connects to the approximate center of a vertical line that connects the father and mother. In some circumstances, it may be desirable to indicate that connection between the father and mother or between the parents and child is of a certain type.

For example, members of certain religious groups such as the Church of Jesus Christ of Latter-Day Saints (i.e., the "LDS church" or the "Mormnon church") have particular interest in genealogy due to doctrinal encouragement to engage in genealogy. These individuals may desire to know if certain religious rights have been performed which they believe affect the relationship between family individuals. For example, the LDS faith asserts that a husband and wife may be "sealed" together for eternity so that the husband and wife relationship does not end at death. Likewise, it is believed that a child may be "sealed" to his/her parents for eternity so the child-parent relationship will likewise continue forever. Individuals that hold this belief might want to know which husbands and wives have been sealed and which children have been sealed to the parents. In this case, distinguishing lines may be used to identify these relationships. For example, a different colored line or a dashed line may represent these relationships.

Other individuals may be concerned with whether a child parent relationship is adoptive or biological. Distinguishing lines may be used to distinguish adoptive relationships from biological relationships as well. Thus, the user may review the pedigree chart and may clearly distinguish relationships of interest.

In one embodiment, records for a large number of individuals are stored remotely at remote computer 149a or 149b. Each individual record may be assigned a unique identifier. Various client computers such as computer system 120 may then make requests for a pedigree chart. The remote computer 149a and 149b may then extract the individual records and use pointers within those records to build the pedigree chart. Each individual record may be used for any number of pedigree charts.

The application software 210 may have provision for allowing a user at one client computer to leave a message in the individual record for others interested in that individual. The message is then included as an attribute in the individual record and uploaded to the remote computer 149a or 149b. The next time the individual record is used by the remote computer 149a or 149b to construct a pedigree chart, the box representing that individual may have a distinguishing feature that identifies that that someone has sent a message concerning that individual. By selecting that individual, subsequent users may read that message.

For example, the message might read the following:
  I have discovered that this person is included in a book entitled *"The genealogy of the Montague Family"* which may be found in text form on the Internet. That book indicates this person's lineage back to royalty in France. I hope this helps. For more information, please e-mail me at the following address: tom@abcdabc.com.

Thus, the messaging may be used to collaborate efforts in genealogy work so that work is not duplicated unnecessarily, or to share a story about the individual, and so forth. The user interface thus may provide a means for the user to easily identify an individual record as having an associated message.

Figure 12:
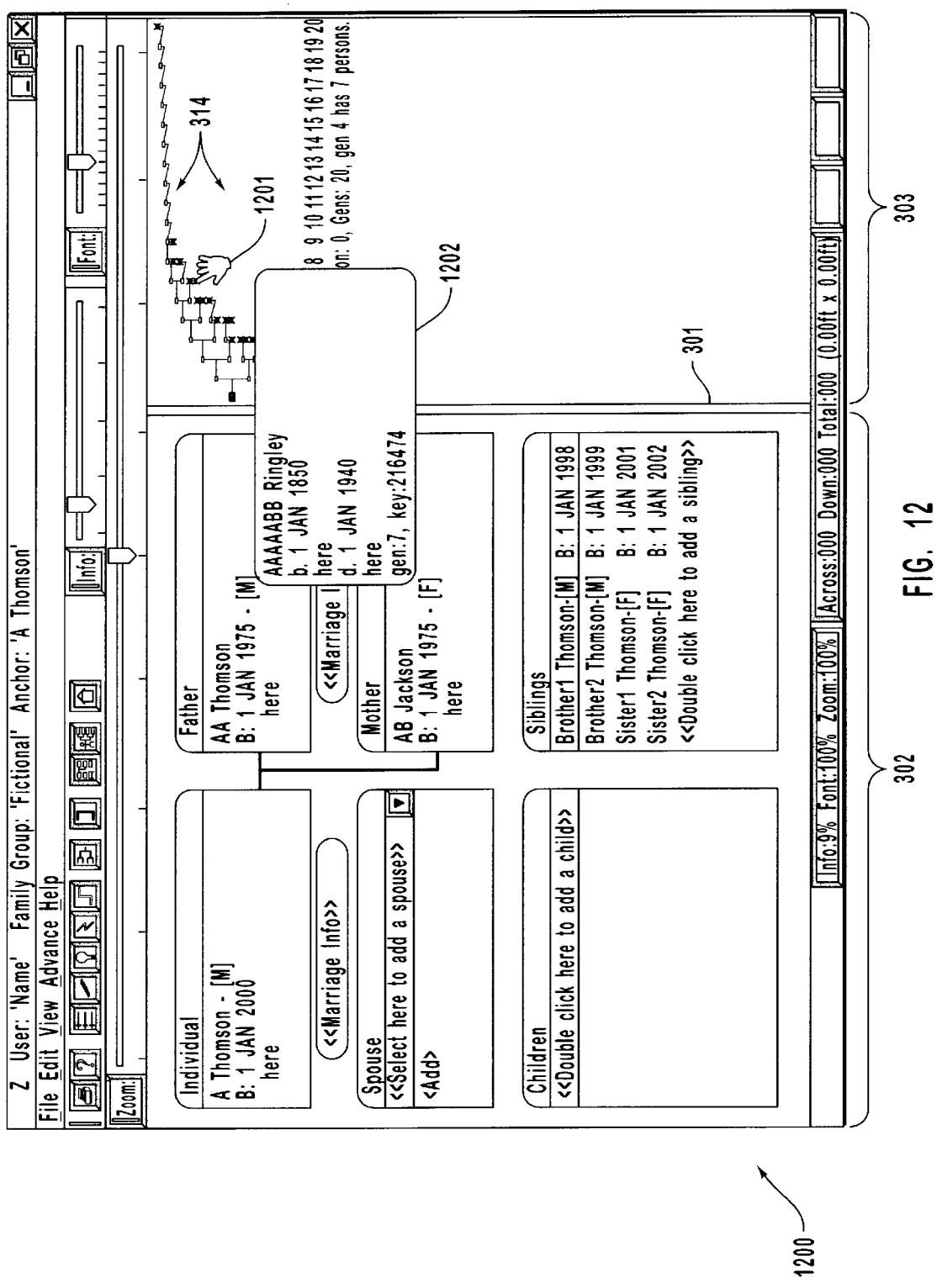
FIG. 12 illustrates the display in which further information regarding a selected individual is shown by moving a pointer over the selected individual.
Figure 13:
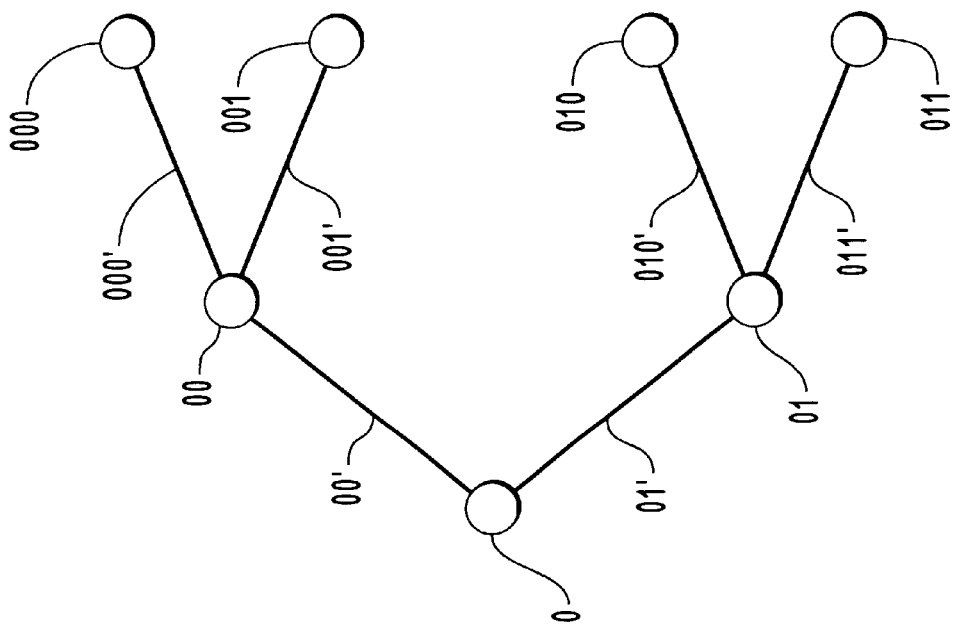
FIG. 13 is a diagram illustrating a pedigree chart.

FIG. 12 illustrates a display 1200 in which a pointer 1201 indicates an individual within the pedigree chart 314 for which more information is desired. By indicating the individual, a window 1202 appears which illustrates the further desired information such as the place and date of birth (i.e., Jan. 1, 1850, "here"), the date and place of death (Jan. 1, 1940, "here", the generation number in which the individual appears (i.e., generation 7), an identifier which uniquely identifies the individual (i.e., key:216474), and the like.

The above describes a method and system for providing a graphical user interface which provides for a clear way to represent genealogical information. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system having a display device, a method of displaying a pedigree chart on the display device, the method comprising the following:
   a specific act of receiving a user-entered instruction to change the resolution of the pedigree chart;
   a specific act of changing the resolution of the pedigree chart in response to the user-entered instruction; and
   a specific act of visually representing either husband-wife or child-parent relationships that have undergone certain religious rites differently than husband-wife or child-parent relationships that have not undergone the certain religious rites.

2. A method in accordance with claim 1, wherein the resolution is an information resolution, wherein the amount of information displayed for each individual in the pedigree chart is changed.

3. A method in accordance with claim 1, wherein the resolution is a font resolution, wherein the size of the textual information describing each individual in the pedigree chart is changed.

4. A method in accordance with claim 1, wherein the resolution is a size resolution which changes the zoom percentage of the pedigree chart.

5. A method in accordance with claim 1, wherein the specific act of changing the resolution of the pedigree chart changes the number of generations of the pedigree chart displayed.

6. The method in accordance with claim 1, further comprising the following:
   a specific act of visually representing individuals at the end of a genealogical line in a different manner than individuals not at the end of a genealogical line.

7. The method in accordance with claim 1, further comprising the following:
   a specific act of visually representing individuals having associated messages in a different manner than individuals not having associated messages.

8. The method in accordance with claim 1, wherein the certain religious rites include sealings.

9. The method in accordance with claim 1, wherein the pedigree chart is displayed in a first frame displayed on the display device, the method further comprising the following:
   a specific act of identifying a selected individual in the pedigree chart; and
   a specific act of displaying individual information concerning the selected individual in a second frame displayed on the display device.

10. The method in accordance with claim 9, further comprising the following:
    a specific act of visually representing the selected individual in the pedigree chart in a different manner than individuals in the pedigree chart that are not selected.

11. A computer-readable medium having computer-executable instructions for performing the specific acts recited in claim 1.

12. In a computer system having a display device for displaying a pedigree chart, a method of visually representing the chronological sibling position of an individual in the pedigree chart, the method comprising:
    displaying a father and mother of the individual, wherein the father and mother are connected by a vertical line;
    receiving a user-generated instruction to display the chronological sibling position of the individual in the family; and
    in response to receiving the user-generated input, displaying horizontal lines extending leftwards from the vertical line, each horizontal line representing a child of the mother and father, one of the horizontal lines identifying the individual, wherein the vertical position of the horizontal line identifying the individual amongst the horizontal lines represents the chronological sibling position of the individual in the family.

13. In a computer system having a display device for displaying a pedigree chart, wherein a plurality of individuals in the pedigree chart are determined to be common ancestors, a method of displaying the pedigree chart so as to emphasize the common ancestors in the pedigree chart, the method comprising:
    displaying the plurality of individuals in the pedigree chart;
    receiving a user-generated instruction to visually emphasize any common ancestors within the pedigree chart; and
    in response to receiving the user-generated input, visually distinguishing the common ancestors from individuals in the pedigree chart that are not common ancestors.

14. In a computer system having a display device for displaying a pedigree chart, wherein the pedigree chart includes an individual for which a link has been established to another individual in a database, a method of visually emphasizing that the individual has an established link with the other individual in the database, the method comprising:
    displaying an individual in the pedigree chart;
    receiving a user-generated instruction to visually emphasize when a link has been established to other individuals in the database for any of the individuals in the pedigree chart; and
    in response to receiving the user-generated input, visually distinguishing the individual that has the established link from other individuals in pedigree chart that have no such established link.

15. In a computer system having a display device for displaying a pedigree chart, wherein the pedigree chart includes an individual that has information that is determined to be in conflict with information in a database, a method of visually emphasizing the conflict on the display device, the method comprising:

displaying the individual in the pedigree chart;

receiving a user-generated instruction to emphasize the conflict; and in response to receiving the user-generated input, visually distinguishing the individual that has been determined to have the conflict from individuals in the pedigree chart for which there has not been determined to be any conflict.

16. In a computer system having a display device for displaying a pedigree chart, a method of visually emphasizing the ancestral line between an individual in the pedigree chart and an ancestor of the individual in the pedigree chart, the method comprising the following:

displaying the individual, the ancestor of the individual, and each intermediary individual in the ancestral line between the individual and the individual;

receiving a user-generated instruction to visually emphasize the ancestral line; and in response to receiving the user-generated instruction, visually emphasizing the ancestral line by highlighting each line in the ancestral line from the ancestor, through the intermediary individuals and to the individual.

17. In a computer system having a display device for displaying a pedigree chart, a method of displaying the pedigree chart so as to show all of the descendant structure of an individual in the pedigree chart, the method comprising:

displaying an individual in the pedigree chart; and receiving a user-generated instruction to display the descendant structure of the individual in the pedigree chart; and in response to receiving the user-generated instruction, displaying the descendant structure of the individual in the pedigree chart.

18. For a computer system having a display device, a computer program product comprising a computer readable medium carrying computer executable instructions that implement a method of displaying a pedigree chart on the display device, the method comprising the following:

a specific act of receiving a user-entered instruction to change the resolution of the pedigree chart;

a specific act of changing the resolution of the pedigree chart in response to the user-entered instruction; and a specific act of visually representing either husband-wife or child-parent relationships that have undergone certain religious rites differently than husband-wife or child-parent relationships that have not undergone the certain religious rites.

19. A computer program product in accordance with claim 18, wherein the resolution is an information resolution, wherein the amount of information displayed for each individual in the pedigree chart is changed.

20. A computer program product in accordance with claim 18, wherein the resolution is a font resolution, wherein the size of the textual information describing each individual in the pedigree chart is changed.

21. A computer program product in accordance with claim 18, wherein the resolution is a size resolution which changes the zoom percentage of the pedigree chart.

22. A computer program product in accordance with claim 18, wherein the specific act of changing the resolution of the pedigree chart changes the number of generations of the pedigree chart displayed.

23. A computer program product in accordance with claim 18, the method further comprising the following;

a specific act of visually representing individuals at the end of a genealogical line in a different manner than individuals not at the end of a genealogical line.

24. A computer program product in accordance with claim 18, the method further comprising the following:

a specific act of visually representing individuals having associated messages in a different manner than individuals not having associated messages.

25. A computer program product in accordance with claim 18, wherein the certain religious rites include sealings.

26. A computer program product in accordance with claim 18, wherein the pedigree chart is displayed in a first frame displayed on the display device, the method further comprising the following:

a specific act of identifying a selected individual in the pedigree chart, and a specific act of displaying individual information concerning the selected individual in a second frame displayed on the display device.

27. A computer program product in accordance with claim 26, the method further comprising the following.

a specific act of visually representing the selected individual in the pedigree chart in a different manner than individuals in the pedigree chart that are not selected.

28. In a computer system having a display device, a method of displaying a pedigree chart on the display device, the method comprising the following:

a specific act of receiving a user-entered instruction to change the resolution of the pedigree chart;

a specific act of changing the resolution of the pedigree chart in response to the user-entered instruction; and a specific act of visually representing individuals at the end of a genealogical line in a different manner than individuals not at the end of a genealogical line.

29. For a computer system having a display device, a computer program product comprising a computer readable medium carrying computer executable instructions that implement a method of displaying a pedigree chart on the display device, the method comprising the following:

a specific act of receiving a user-entered instruction to change the resolution of the pedigree chart;

a specific act of changing the resolution of the pedigree chart in response to the user-entered instruction, and a specific act of visually representing individuals at the end of a genealogical line in a different manner than individuals not at the end of a genealogical line.

30. In a computer system having a display device, a method of displaying a pedigree chart on the display device, the method comprising the following:

a specific act of receiving a user-entered instruction to change the resolution of the pedigree chart;

a specific act of changing the resolution of the pedigree chart in response to the user-entered instruction; and a specific act of visually representing individuals having associated messages in a different manner than individuals not having associated messages.

31. For a computer system having a display device, a computer program product comprising a computer readable medium carrying computer executable instructions that implement a method of displaying a pedigree chart on the display device, the method comprising the following;

a specific act of receiving a user-entered instruction to change the resolution of the pedigree chart;

a specific act of changing the resolution of the pedigree chart in response to the user-entered instruction; and a specific act of visually representing individuals having associated messages in a different manner than individuals not having associated messages.

32. In a computer system having a display device, a method of displaying a pedigree chart on the display device, wherein the pedigree chart is displayed in a first frame on the display device, the method comprising the following:

a specific act of receiving a user-entered instruction to change the resolution of the pedigree chart;

a specific act of changing the resolution of the pedigree chart in response to the user-entered instruction;

a specific act of identifying a selected individual in the pedigree chart; and a specific act of displaying individual information concerning the selected individual in a second frame displayed on the display device.

33. The method in accordance with claim 32, further comprising the following:

a specific act of visually representing the selected individual in the pedigree chart in a different manner than individuals in the pedigree chart that are not selected.

34. For a computer system having a display device, a computer program product comprising a computer readable medium carrying computer executable instructions that implement a method of displaying a pedigree chart On the display device, wherein the pedigree chart is displayed in a first frame on the display device, the method comprising the following:

a specific act of receiving a user-entered instruction to change the resolution of the pedigree chart;

a specific act of changing the resolution of the pedigree chart in response to the user-entered instruction;

a specific act of identifying a selected individual in the pedigree chart; and a specific act of displaying individual information concerning the selected individual in a second frame displayed on the display device.

35. A computer program product in accordance with claim 34, the method further comprising the following:

a specific act of visually representing the selected individual in the pedigree chart in a different manner than individuals in the pedigree chart that are not selected.

36. For a computer system having a display device for displaying a pedigree chart, a computer program product comprising a computer readable medium carrying computer executable instructions that implement a method of visually representing the chronological sibling position of an individual in the pedigree chart, the method comprising:

displaying a father and mother of the individual, wherein the father and mother arc connected by a vertical line;

receiving a user-generated instruction to display the chronological sibling position of the individual in the family; and in response to receiving the user-generated input, displaying horizontal lines extending leftwards from the vertical line, each horizontal line representing a child of the mother and father, one of the horizontal lines identifying the individual, wherein the vertical position of the horizontal line identifying the individual amongst the horizontal lines represents the chronological sibling position of the individual in the family.

37. For a computer system having a display device for displaying a pedigree chart wherein a plurality of individuals in the pedigree chart are determined to be common ancestors, a computer program product comprising a computer readable medium carrying computer executable instructions that implement a method of displaying the pedigree chart so as to emphasize the common ancestors in the pedigree chart, the method comprising:

displaying the plurality of individuals in the pedigree chart;

receiving a user-generated instruction to visually emphasize any common ancestors within the pedigree chart; and in response to receiving the user-generated input, visually distinguishing the common ancestors from individuals in the pedigree chart that are not common ancestors.

38. For a computer system having a display device for displaying a pedigree chart, wherein the pedigree chart includes an individual for which a link has been established to another individual in a database, a computer program product comprising a computer readable medium carrying computer executable instructions that implement a method of visually emphasizing that the individual has an established link with the other individual in the database, the method comprising:

displaying an individual in the pedigree chart;

receiving a user-generated instruction to visually emphasize when a link has been established to other individuals in the database for any of the individuals in the pedigree chart; and in response to receiving the user-generated input, visually distinguishing the individual that has the established link from other individuals in pedigree chart that have no such established link.

39. For a computer system having a display device for displaying a pedigree chart, wherein the pedigree chart includes an individual that has information that is determined to bc in conflict with information in a database, a computer program product comprising a computer readable medium carrying computer executable instructions that implement a method of visually emphasizing the conflict on the display device, the method comprising:

displaying the individual in the pedigree chart;

receiving a user-generated instruction to emphasize the conflict; and in response to receiving the user-generated input, visually distinguishing the individual that has been determined to have the conflict from individuals in the pedigree chart for which there has not been determined to be any conflict.

40. For a computer system having a display device for displaying a pedigree chart, a computer program product comprising a computer readable medium carrying computer executable instructions that implement a method of visually emphasizing the ancestral line between an individual in the pedigree chart and an ancestor of the individual In the pedigree chart, the method comprising the following:

displaying the individual, the ancestor of the individual, and each intermediary individual in the ancestral line between the individual and the individual;

receiving a user-generated instruction to visually emphasize the ancestral line; and in response to receiving the user-generated instruction, visually emphasizing the ancestral line by highlighting each line in the ancestral line from the ancestor, through the intermediary individuals and to the individual.

41. For a computer system having a display device for displaying a pedigree chart, a computer program product comprising a computer readable medium carrying computer executable instructions that implement a method of displaying the pedigree chart so as to show all of the descendant structure of an individual in the pedigree chart, the method comprising:

displaying an individual in the pedigree chart; and receiving a user-generated instruction to display the descendant structure of the individual in the pedigree chart; and in response to receiving the user-generated instruction, displaying the descendant structure of the individual in the pedigree chart.

* * * * *